Oct. 13, 1953   A. L. JOHNSON   2,654,923
WOOD JOINT CONNECTOR
Filed June 27, 1949
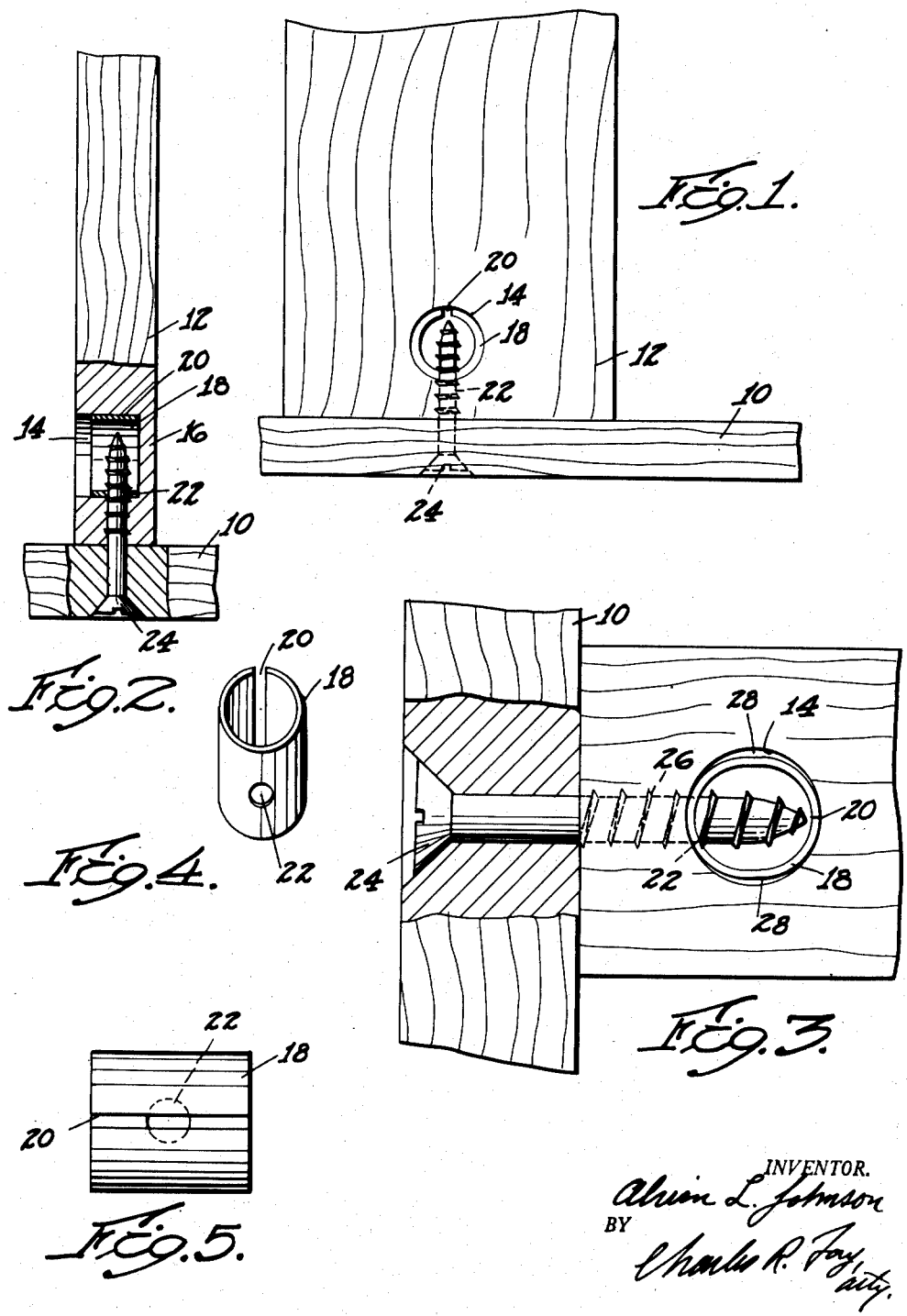
INVENTOR.
Alvin L. Johnson
BY
Charles R. Fay
atty.

Patented Oct. 13, 1953

2,654,923

UNITED STATES PATENT OFFICE 2,654,923

WOOD JOINT CONNECTOR

Alvin L. Johnson, Worcester, Mass.

Application June 27, 1949, Serial No. 101,578

2 Claims. (Cl. 20—92)

This invention relates to joint connectors which are particularly adapted for improving the joints formed by two pieces of wood and specifically where one piece of wood presents an end grain to the other, whereby a screw through one member into the end grain can never become loosened unintentionally.

Another object of the invention resides in the improvement of a wooden joint, making the same more rigid and longer lasting than similar joints of the prior art, particularly in cases where a fastener is to be inserted into the end grain of one of the members, making up the joint.

A further object of the invention resides in the provision of a joint of the class described comprising a pair of members, one of which is provided with a hole receiving a split metal band and a screw type of fastener or the like being entered through the other member into the member having the hole and threaded through the metal band to the end that the latter is firmly clamped to the wood in the hole and clamps the fastener so that the latter is immovable due to distortion in the band caused by the fastener itself.

A still further object of the invention resides in the provision of a split metal band having a hole in it opposite the split for use in making wooden joints by insertion in one member forming the joint, a screw being thrust through the other member and into the hole in the band and turned up therein, the screw holding the band and the band being distorted thereby so as to immovably hold the screw.

Other objects and advantages of the invention will appear hereinafter.

Reference is to be had to the accompanying drawings in which

Fig. 1 is a view in elevation of a wooden joint embodying the invention;

Fig. 2 is a section therethrough;

Fig. 3 is an enlarged view in elevation showing the action of the screw on the metal band and vice versa, part being in section;

Fig. 4 is a perspective view of a metal band; and

Fig. 5 is a view in front elevation thereof.

As is well known in the art, the making of wooden joints is a serious problem and always has been as long as furniture and similar articles have been made of wood. The main problem is first to provide a rigid long lasting joint and second, to provide such a joint which may be dismantled. No matter what scheme or design is used, all wooden joints eventually loosen especially where one of the members forming the joint presents an end grain to the element fastening the members together to form the joint. This is, of course, obviously true where a nail is used and also where a wood screw is used; but it is also true of dowels and the like whether cemented or expanded.

The present invention, however, completely overcomes this difficulty and provides a joint which is not only permanent but can be dismantled or taken apart.

Referring to the drawings, there is shown a member 10 forming one member of the joint and a member 12 forming the other member of the joint and presenting an end grain to member 10. Ordinarily, the member 10 will be provided with screws, nails or dowels, which will be thrust parallel to the grain in member 12.

In this case, however, there is provided a hole at 14 extending all the way or only part way through the member 12, as shown in Figs. 1 and 2. In cases where the hole 14 does not extend all the way through the member 12, there is a floor 16 left which is useful for positioning the metal band 18, to be described.

The metal band 18, see Figs. 4 and 5, is in reality a split band, the split appearing at 20. Diametrically opposite the split there is a hole 22 for the reception of a wood screw 24. The wood screw being self-threading is started into the hole 22 and turned thereinto as in a nut; or in some cases, depending on the pitch of the threads, the screw cuts threads into the edge of the band surrounding the hole 22. In either case, a strong rigid connection is made between the band 18 and the screw itself.

Referring now to Fig. 3, when the screw 24 is almost seated, further turning up thereof has the effect of creating an internal pressure on the band 18 so that it is drawn very strongly against the side of the hole toward the member 10, as indicated at 26. Due to curvature of the hole itself, the two arms of the band defining the split 20 are drawn together and retracted from the edges of the hole, as at 28, thus closing the split 20, as clearly indicated in Fig. 3.

It will be seen that by this action the band 18 is under a definite and relatively great stress, the stress being sufficient to distort the band and cause it to grip the screw 24 by the threads of the latter, so that the screw can never shake loose from the band and cannot be accidentally backed off. For this reason, the screw will never become loose and the joint will be permanently tight; however, the screw can be removed in the ordinary way by a screw driver but naturally more pressure will have to be used in order to accomplish this than were the band not present.

Having thus described my invention and the advantages thereof, I do not wish to be limited to the details herein disclosed otherwise than as set forth in the claims, but what I claim is:

1. A device of the class described comprising a split distortable band for insertion in a recess in a member forming a joint, said band having an opening therein removed from the split, in combination with a screw for penetration of the member and the band, said band being generally circular, the screw penetrating the band through the opening therein at a point removed from the split, said screw and contact of the band with a wall of the recess causing the band to be distorted and drawn in so that the edges thereof defining the split come into substantial contact, whereby the sides of the opening in the band grip the screw due to the distortion of the band.

2. A joint fastener comprising a split distortable band having a hole therein for insertion in one of two members forming a joint, a screw passing through another joint member and into the hole, said band being located in a recess in the one member, the screw being arranged generally diametrically of the band and distorting and drawing the band into close engagement with the wall of the recess, and causing the portions of the band defining the split to converge so that the band is distorted and the sides of the recess cause the band to grip the screw at the hole in the band.

ALVIN L. JOHNSON.

References Cited in the file of this patent

UNITED STATES PATENTS

| Number | Name | Date |
|---|---|---|
| 947,602 | Stahl et al. | Jan. 25, 1910 |
| 1,058,475 | Shepard | Apr. 8, 1913 |
| 1,671,757 | Allen | May 29, 1928 |